(12) United States Patent
Custer et al.

(10) Patent No.: US 8,017,067 B2
(45) Date of Patent: Sep. 13, 2011

(54) METHOD OF MAKING A SINGLE FIRE HONEYCOMB STRUCTURE

(75) Inventors: Martha Blanche Custer, Painted Post, NY (US); Margaret Kathleen Faber, Corning, NY (US); Weiguo Miao, Horseheads, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 938 days.

(21) Appl. No.: 11/897,137

(22) Filed: Aug. 29, 2007

(65) Prior Publication Data

US 2008/0057234 A1    Mar. 6, 2008

Related U.S. Application Data

(60) Provisional application No. 60/840,798, filed on Aug. 29, 2006.

(51) Int. Cl.
*C04B 24/08* (2006.01)
*C04B 35/634* (2006.01)

(52) U.S. Cl. ......... 264/629; 264/630; 264/148; 264/150

(58) Field of Classification Search .................. 264/629, 264/630, 631, 150, 148
See application file for complete search history.

(56) References Cited

U.S. PATENT DOCUMENTS

| | | | | |
|---|---|---|---|---|
| 4,375,987 | A | 3/1983 | Lange et al. | 106/95 |
| 4,563,414 | A | 1/1986 | Ogawa et al. | 430/325 |
| 5,188,779 | A | 2/1993 | Horikawa et al. | 264/62 |
| 5,603,760 | A | 2/1997 | Berke et al. | 106/802 |
| 6,207,101 | B1 * | 3/2001 | Beall et al. | 264/630 |
| 6,699,428 | B2 | 3/2004 | Nishi et al. | 264/630 |
| 6,811,737 | B2 | 11/2004 | Fukuta et al. | 264/482 |
| 7,052,735 | B2 | 5/2006 | Nate et al. | 427/230 |
| 7,156,934 | B2 | 1/2007 | Fukuta et al. | 156/89.22 |
| 7,208,108 | B2 | 4/2007 | Otsuka et al. | 264/44 |
| 2004/0051196 | A1 * | 3/2004 | Otsuka et al. | 264/41 |
| 2004/0071932 | A1 | 4/2004 | Ishihara et al. | 428/116 |
| 2004/0092381 | A1 * | 5/2004 | Beall et al. | 501/134 |
| 2004/0131772 | A1 | 7/2004 | Yamada et al. | 427/230 |
| 2004/0198599 | A1 | 10/2004 | Kato et al. | 502/439 |
| 2004/0239011 | A1 | 12/2004 | Ishihara | 264/628 |
| 2005/0042419 | A1 | 2/2005 | Kato | 428/131 |
| 2005/0076991 | A1 | 4/2005 | Fujita | 156/89.22 |
| 2007/0037703 | A1 | 2/2007 | Muroi | 502/439 |
| 2007/0261378 | A1 | 11/2007 | Miao et al. | 55/523 |

FOREIGN PATENT DOCUMENTS

| | | |
|---|---|---|
| EP | 1 245 360 | 10/2002 |
| JP | 2004-82098 | 3/2004 |

* cited by examiner

*Primary Examiner* — John Hoffmann
(74) *Attorney, Agent, or Firm* — Randall S. Wayland; Matthew B. McNutt; Mattew J. Mason

(57) ABSTRACT

A method for manufacturing a honeycomb structure comprises providing an aqueous ceramic solution, providing a batch cross-link agent, mixing the agent with the solution, extruding the aqueous ceramic solution containing the cross-link agent into a honeycomb structure, and drying the honeycomb structure via a single drying step thereby forming a hardened, substantially water resistant, honeycomb structure. The method may further comprise addition of a ceramic surfactant to the aqueous ceramic solution, as well as plugging channels within the honeycomb structure with a plugging material comprising an aqueous ceramic solution that includes batch cross-link agents and ceramic surfactants therein. Also disclosed is a green body honeycomb article having a green honeycomb matrix containing a first ceramic batch compound of inorganic constituents, a first batch cross-link agent, and an aqueous vehicle wherein the matrix includes interconnected walls forming open-ended channels and a plugging material located in at least one of the open-ended channels.

12 Claims, 4 Drawing Sheets

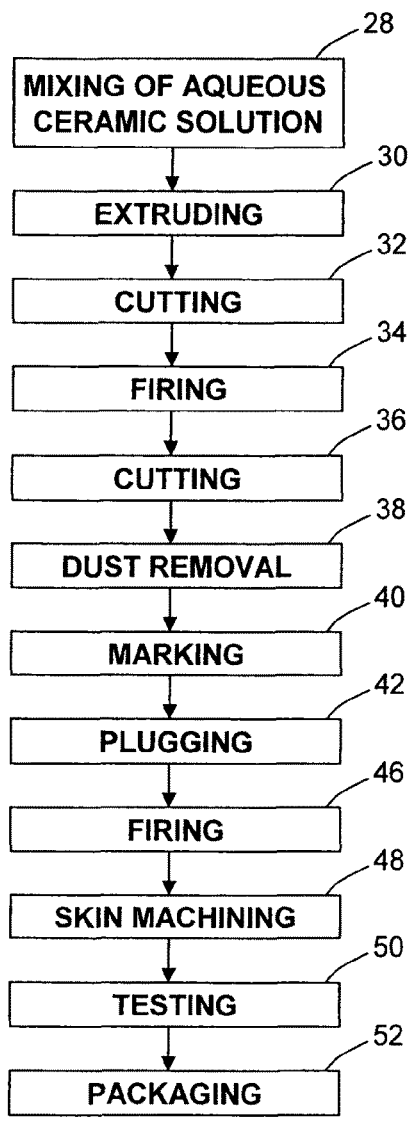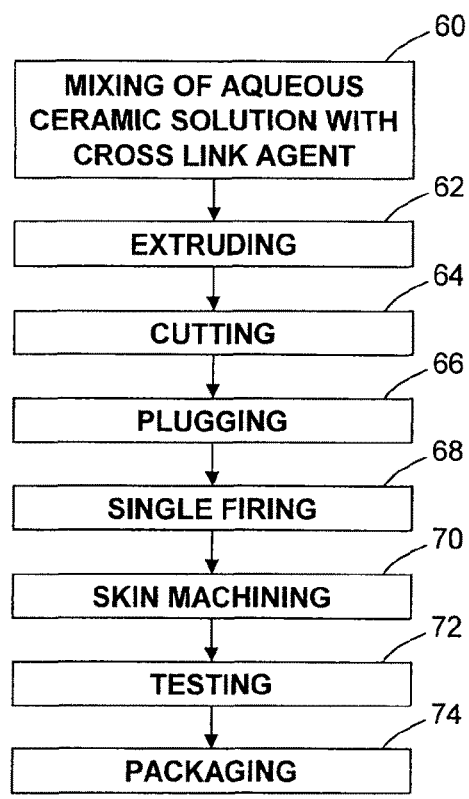
FIG. 4
PRIOR ART
FIG. 5

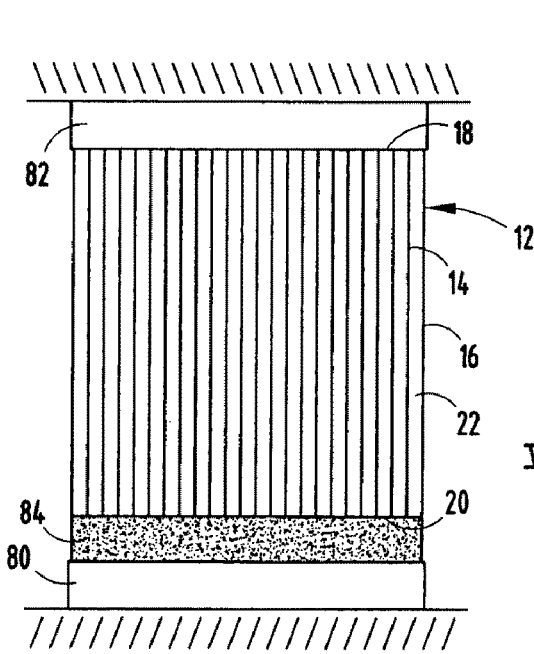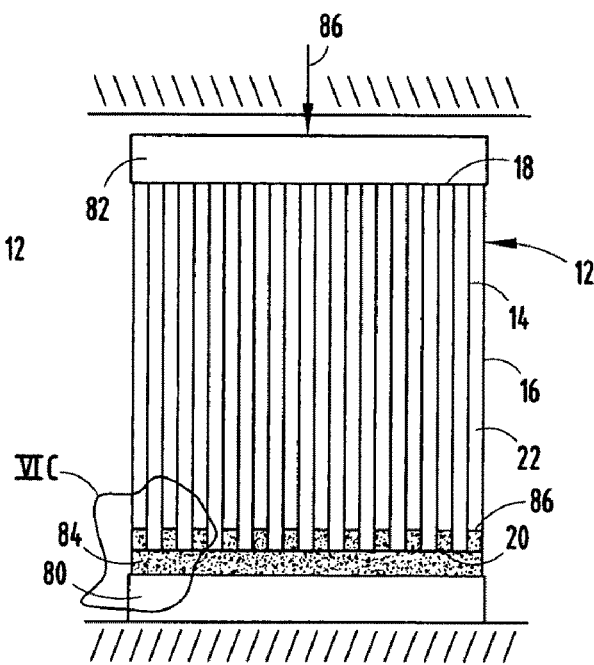
FIG. 6A  FIG. 6B
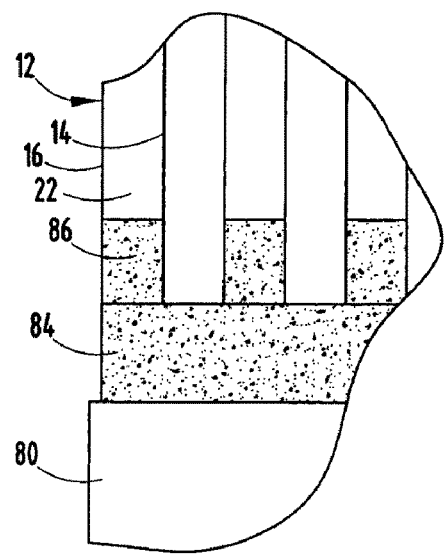
FIG. 6C

US 8,017,067 B2

METHOD OF MAKING A SINGLE FIRE HONEYCOMB STRUCTURE

RELATED APPLICATIONS

This application claims the benefit of U.S. Provisional Application No. 60/840,798, filed Aug. 29, 2006, entitled "Single Fire Honeycomb Structure and Method for Manufacturing Same," the disclosure of which is hereby incorporated by reference herein.

BACKGROUND OF THE INVENTION

1. Field of the Invention

This invention relates to the manufacture of ceramic honeycomb structures used as particulate traps and heat exchangers, and in particular to forming the honeycomb structures from aqueous ceramic solutions that include ceramic or batch cross-link agents therein that promote cross-linking of the materials used to construct the honeycomb structure, thereby increasing the structural integrity of the same.

2. Description of Related Art

Honeycomb structures having traverse cross-sectional cellular densities of approximately 1/10 to 100 cells or more per square centimeter have several uses, including solid particulate filter bodies and stationary heat exchangers. Such uses require selected cells of the structure to be sealed or plugged by manifolding and the like at one or both of the respective ends thereof.

Reference numeral 10 (FIG. 1) generally designates a solid particular filter body that is generally well known and that may be fabricated utilizing a method as described below. The filter body 10 includes a honeycomb structure 12 formed by a matrix of intersecting, thin, porous walls 14 surrounded by an outer wall 15, which in the illustrated example is provided a circular cross-sectional configuration. The walls 14 extend across and between a first end 13 that includes a first end face 18, and a second end 17 that includes an opposing second end face 20, and form a large number of adjoining hollow passages or cell channels 22 which also extend between and are open at the end faces 18, 20 of the filter body 10. To form the filter 10 (FIGS. 2 and 3), one end of each of the cells 22 is sealed, a first subset 24 of the cells 22 being sealed at the first end face 18, and a second subset 26 of the cells 22 being sealed at the second end face 20. Either of the end faces 18, 20 may be used as the inlet face of resulting filter 10.

A typical method for manufacturing the honeycomb structure 12 described above includes the steps of batch mixing 28 (FIG. 4) an aqueous ceramic solution used to form the walls 14, 15 of the honeycomb structures 12, extruding 30 the aqueous ceramic solution through die sets thereby forming a green ware honeycomb structure, and cutting 32 the green ware honeycomb structure into a particular length. The method also includes firing 34 of the green ware honeycomb structure to form a hardened honeycomb structure, cutting 36 the hardened honeycomb structure 12 to provide finished end faces, removing the dust 38 created during the cutting process 36, masking 40 the end faces 18, 20 of the honeycomb structure 12, plugging 42 certain cell channels 22 of the honeycomb structure 12, firing 46 of the plugged honeycomb structure 12 to form a hardened filter 10 and machining 48 an outer skin of the filter 10. The method further includes testing 50 the filter 10 and packaging 52 the same for shipment. As is evident from the above, the current method used to manufacture the filter 10 is time intensive, lengthy and costly, and that any steps or procedures available to reduce the overall cycle time associated with manufacturing these filters while maintaining manufacturing and filter quality standards, would be extremely advantageous.

In operation, contaminated fluid is brought under pressure to an inlet face (either of the end faces 18, 20) and enters the filter 10 via those cell channels 22 which have an open end at the given inlet face. Because these cell channels 22 are sealed at the opposite end face, i.e., the outlet face of the body, the contaminated fluid is forced through thin porous walls 14 into adjoining cell channels 22 which are sealed at the inlet face and open at the outlet face. The solid particulate contaminate in the fluid, which is too large to pass through the porous openings in the walls 14, is left behind and a cleansed fluid exits the filter 10 through the outlet cell channels 24 and is ready for use.

For the mass production of such filters and heat exchangers, it is highly desirable to be able to seal selected cell channel ends as rapidly and as inexpensively as possible, while maintaining certain quality standards in the resultant filters. As noted above, heretofore the mass production of these filters included forming of a green ware honeycomb structure followed by a first firing process in order to provide a hardened honeycomb structure, and then the plugging of the hardened honeycomb structure followed by a second firing process. As the firing or curing processes are ultimately the most expensive portion of the overall manufacturing process, it is desirable to reduce the amount of time involved therewith.

Another previous approach to plugging the honeycomb structure 12 to form the filter 10 has included the cold-set plugging of the material used to seal the ends 18, 20 of the honeycomb structure 12. However, this particular approach includes significant risks as the cold-set plugs do not experience the thermal history of the honeycomb structure 12 during the manufacturing process, and may therefore prove less durable during operations in the field.

A final approach includes the plugging of the honeycomb structure 12 prior to the firing or drying thereof to form a plugged green ware honeycomb structure. Heretofore, significant drawbacks to this approach have included the smearing of the honeycomb structure 12 near the end faces 18, 20, and a weak interface between the plug material and the walls 14 forming the web within the honeycomb structure 12. Specifically, the typical composition used for forming the honeycomb structure 12 is not water resistant, thereby allowing the associated walls 14 to absorb water from the plugging material and be distorted during the plugging process. For those materials which are non-water based, typical results have been a poor interface between the plug material and the walls 14, thereby resulting in an overall weak filter that does not perform well in field conditions.

A method for manufacturing a honeycomb structure that may be utilized as a filter, such as those used as particulate traps for diesel engines, is desired that reduces the overall manufacturing time by reducing the amount of time associated with firing or curing of the honeycomb structure while simultaneously maintaining or improving the structural integrity of the resultant filter.

SUMMARY OF THE INVENTION

According to embodiments of the present invention, a method for manufacturing a honeycomb structure is provided comprising the steps of providing an aqueous ceramic solution and a batch cross-link agent mixed into the aqueous ceramic solution, forming the aqueous ceramic solution into a honeycomb structure, and drying the honeycomb structure via a single drying step, such that the honeycomb structure is substantially water resistant.

In accordance with additional embodiments, a method for manufacturing a honeycomb structure is provided comprising the steps of providing a mixed solution comprising a first aqueous ceramic solution and a batch cross-link agent, extruding the mixed solution into a honeycomb structure, plugging the honeycomb structure with a second aqueous solution, and drying the honeycomb structure in a single drying step.

According to other embodiments, the invention is a green body honeycomb article, comprising a green honeycomb matrix comprising a first ceramic batch compound, a first batch cross-link agent, and an aqueous vehicle, wherein the first ceramic batch compound comprises inorganic constituents, and wherein the green honeycomb matrix includes a plurality of interconnected walls forming a plurality of open-ended channels; and a plugging material located in at least one of the open-ended channels.

The present inventive method for producing a honeycomb structure that may be utilized as a filter, such as those used as a particulate trap for a diesel engine, reduces the overall manufacturing time by reducing the amount of time associated with firing or curing the honeycomb structure, while simultaneously improving the structural integrity of the resultant filter. Specifically, the inventive inclusion of the batch cross-link agents within the aqueous ceramic solution used to form the honeycomb structure allows the honeycomb structure to be cured during a single firing step as compared to previously required multiple firing steps. The present inventive method reduces the associated manufacturing costs, may be implemented within current manufacturing systems without significant alteration to the systems, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 4 is a flow chart of a prior art process for forming a plugged honeycomb structure;

FIG. 5 is a flow chart of a process for forming a plugged honeycomb structure, and embodying the present invention;

FIG. 6A is a cross-sectional side view of a honeycomb structure, a top platen, and a bottom platen, with the top platen located in a starting position;

FIG. 6B is a cross-sectional side view of the honeycomb structure and the top and bottom platens with a plugging material moved into the second subset of cell channels;

FIG. 6C is an enlarged cross-sectional side view of the area VIC, FIG. 6B;

DETAILED DESCRIPTION

Figure 1:
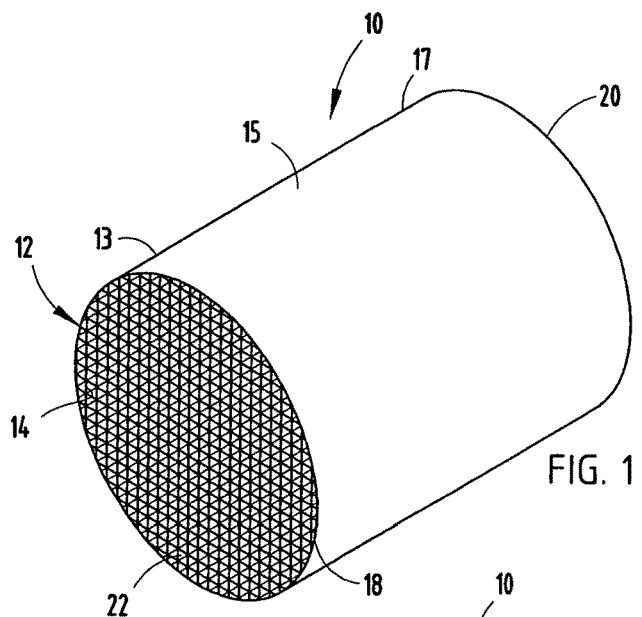
FIG. 1 is a perspective view of an extruded filter body including a first end having a plurality of open-ended cell channels.
Figure 2:
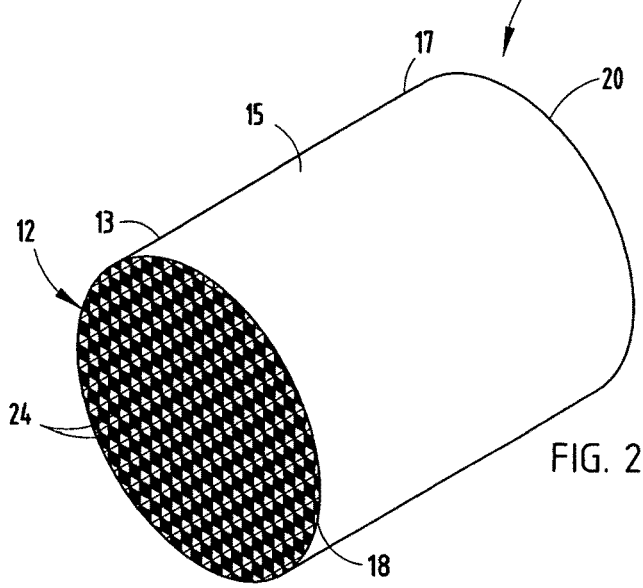
FIG. 2 is a perspective view of the extruded filter body, wherein a first subset of the cell channels are plugged, and a second subset of the channels are open-ended.
Figure 3:
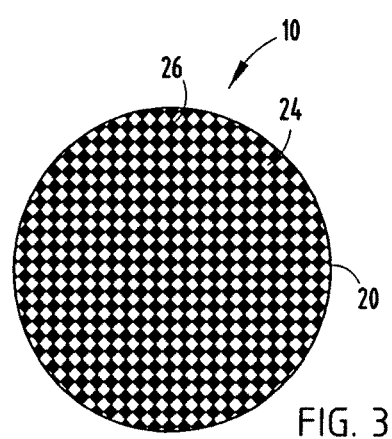
FIG. 3 is an end view of the filter body including a second end, wherein the first subset of the cell channels are open-ended and a second subset of the cell channels are plugged.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Several methods and procedures are known in the art for forming the honeycomb structure 12 that includes the plurality of hollow passages or cell channels 22 extending therethrough. The present inventive process is incorporated within an overall process that comprises the mixing 60 (FIG. 5) of a wet aqueous ceramic solution, extruding 62 the aqueous ceramic solution through an extrusion die to form a green ware honeycomb structure, and cutting 64 the green ware honeycomb structure into a plurality of segmented portions to form an unplugged honeycomb structure. Each end face 18, 20 of the unplugged honeycomb structure is then plugged 66 to form a plugged honeycomb structure that is then fired 68. The resultant filter body is then skin machined 70, tested for integrity 72 and packaged 74 for delivery. Several steps of this overall process are known to those skilled in the art, and as such are not discussed in detail herein.

The step of mixing 60 includes forming a ceramic solution by combining a base batch compound and at least one ceramic cross-link agent within an aqueous vehicle, such as water. In the instant example, the base batch compound comprises inorganic constituents including oxides, oxide compounds, metal compounds and mixtures thereof. The cross link agent promotes the formation of a network type structure within the ceramic solution as the honeycomb structure 12 dries subsequent to the extrusion thereof. While it is contemplated that any cross-link agent capable of cross-linking with the ceramic solution may be utilized, it is preferable that the cross-linking agent comprise an agent reacting with a hydroxyl group via a condensation or ring open mechanism, and more preferably that the cross-link agent is selected from a group consisting of formaldehyde, diahehyde, acrylic anhydride, diisocyanate, epihalohydrin, polyamides, polyacrolein and polyimines. It is noted that the term "batch" as utilized herein includes an inorganic, methocel binder, starch pore former. The resultant honeycomb structure 12 is highly water resistant, thereby resisting the smearing effects during the plugging process 66.

The step of plugging the green honeycomb structure 12 includes charging a flowable material, such as a slurry comprising a water diluted ceramic solution, into selected cell channels 22. An example of the plugging process 66 is best illustrated in FIGS. 6A-6C, and utilizes a fixed bottom platen 80 and a moveable top platen or piston 82. The present configuration of the platens 80, 82 are for illustrative purposes only, and it is noted that other methods for charging or plugging the cell channels 22 may be utilized. In the illustrated example, the plugging material is provided in the form of a cement patty 84 positioned between the bottom platen 80 and the second end face 20 of the green honeycomb structure 12. The top platen or piston 82 is then moved in a direction as indicated and represented by directional arrow 86 so as to force at least a portion of the plugging material or cement patty 84 into the unmasked open ends of the cell channels 22, thereby forming a plurality of plugs 86 within selected cell channels 22.

This invention solves the problem of leaving a non-cross linked water soluble polymer, such as methocel, present in the extruded body, that can later react with the water present in the plugging material 84. As a result of the cross-linking reaction, the re-hydration of the methocel is reduced, thereby making the honeycomb structure 12 substantially water resistant during the plugging process 66. As a result, this cross-linking eliminates the smearing effect typically caused during the plugging 66 of the select cell channels 22 of the green ware honeycomb structure 12, and eliminates the need for firing the green ware honeycomb structure prior to the plugging thereof. The elimination of the step of firing the green ware honeycomb structure prior to plugging the same significantly reduces the cycle time associated with manufacturing the filter 10 and the costs associated therewith.

In a preferred embodiment of the present inventive method, the mixing step 60 preferably includes the inclusion of a ceramic surfactant therein. The ceramic surfactant as added during the mixing step 60 allows the aqueous ceramic solution to be more easily extruded during the extruding step 62. Preferably, the ceramic surfactant is selected from a group including tall oil, tall oil with an amine additive, and liga, although other suitable surfactants may be utilized.

Another preferred embodiment of the present inventive process includes providing the plugging material 84 in a form similar to the combination used to form the green honeycomb structure, including a base batch compound and at least one ceramic cross-link agent mixed within an aqueous vehicle. The agents added to the solution to promote cross-linking thereof are similar to those discussed above with respect to the solution used to form the honeycomb structure 12. These cross-link agents preferably promote cross-linking not only within the plug material 84 itself, but also between the extruded green ware honeycomb structure 12 and the plug material 84, thereby resulting in a coherently strong bond therebetween and increasing the overall structural integrity of the resultant filter 10. Similar to that discussed above with respect to the solution utilized to form the honeycomb structure 12, a ceramic surfactant may be added to the solution of the plug material 84.

EXAMPLE

Several samples were completed utilizing the present inventive method. While the exact amount of any cross-link agent utilized within the associated aqueous ceramic solution for forming the honeycomb structure and/or the associated plugging material is determined by the amount of methocel within the aqueous ceramic solution, illustrative examples are provided herein. For example, in the case of four weight percent methocel, 0.1 to 5 weight percent cross-link agents may be used. Moreover, the cross-linkable surfactant was added to the batch material to improve extrudability and cross-link effect. In the present example, Elmusi T, a mixture of triethanol amine and tall oil, was used as a surfactant. The following table shows a typical composition:

TABLE 1

| EX80 SINGLE FIRING COMPOSITION SHEET | | |
|---|---|---|
| | Cross-linker additive (wt %) | Surfactant additive (wt %) |
| DPF batch (EX80 based) | BERSET 2700 solution 0.1-10 | Elmusi T 0.1-20 |
| Plug batch (PC80) | BERSET 2700 solution 0.1-10 | Elmusi T 0.1-20 |

Figure 7A:
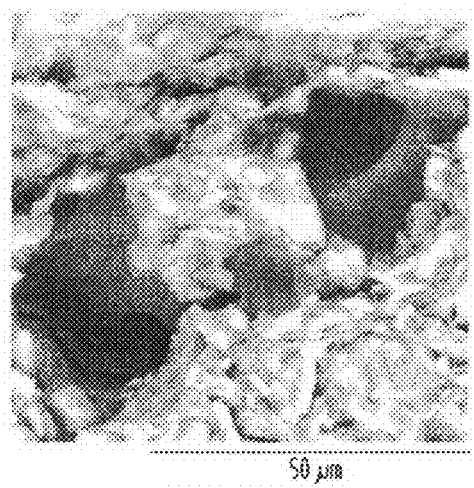
FIG. 7A is an enlarged cross-sectional view of a polished green ware surface, wherein the green ware comprises a potato starch without a cross-link agent added thereto.
Figure 7B:
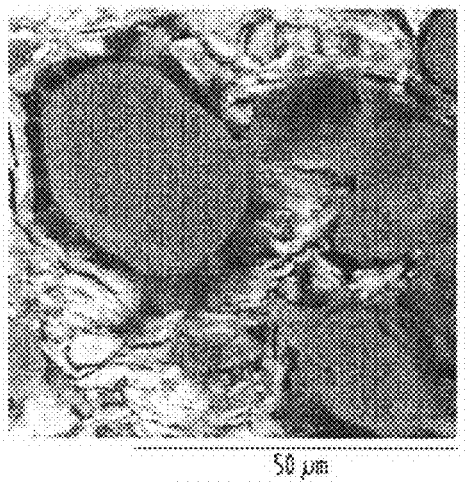
FIG. 7B is an enlarged cross-sectional view of a polished green ware surface, wherein the green ware comprises a potato starch with a cross-link agent added thereto.
Figure 7C:
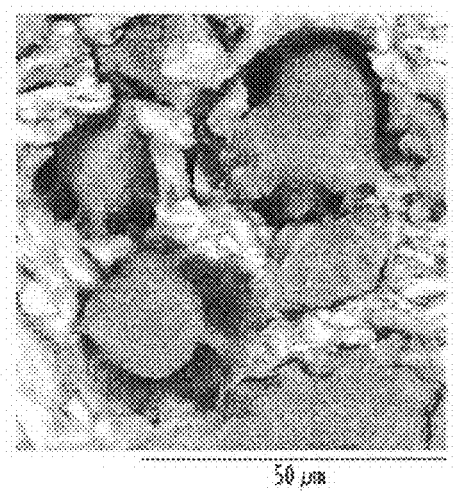
FIG. 7C is an enlarged cross-sectional view of a polished green ware surface, wherein the green ware comprises a sago starch with a cross-link agent added thereto.
Figure 7D:
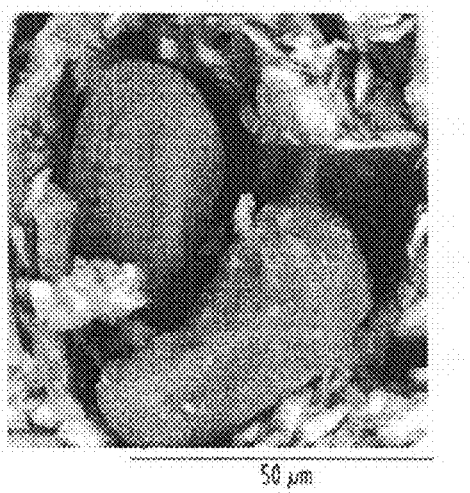
FIG. 7D is an enlarged cross-sectional view of a polished green ware surface, wherein the green ware comprises canna starch with a cross-link agent added thereto.

Examples of both cross linked and non-cross linked material batches are shown in FIGS. 7A-7D, which clearly illustrate the advantages received by the addition of the cross-link additive. FIG. 7A shows potato starch without crosslink agent. FIG. 7B shows potato starch with crosslink agent. FIG. 7C shows sago starch with crosslink agent. FIG. 7D shows canna starch with crosslink agent.

It will become apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

What is claimed is:

1. A method for manufacturing a honeycomb structure, comprising the steps of:
    providing a first base batch compound comprising inorganic constituents;
    providing a first batch cross-link agent;
    providing an aqueous vehicle;
    providing a first ceramic surfactant, the first ceramic surfactant selected from the group consisting of tall oil and tall oil with an amine additive;
    mixing the first base batch compound, the first batch cross-link agent, the first ceramic surfactant, and the aqueous vehicle to form a ceramic solution, wherein the first batch cross-link agent is capable of cross-linking with the ceramic solution;
    forming the first base batch compound, the first batch cross-link agent, the first ceramic surfactant, and the aqueous vehicle into a green honeycomb structure having a plurality of channels;
    providing a plugging compound;
    plugging at least one of the plurality of channels of the green honeycomb structure with the plugging compound to form a plugged, green honeycomb structure; and
    drying the plugged, green honeycomb structure via a drying step, thereby forming a hardened honeycomb structure.

2. The method of claim 1, wherein the first batch cross-link agent comprises an agent reacting with a hydroxyl group via at least one of a condensation mechanism and a ring open mechanism.

3. The method of claim 2, wherein the first batch cross-link agent is selected from the group consisting of formaldehyde, diahehyde, acrylic anhydride, diisocyanate, epihalohydrin, polyamides, polyacrolein and polyimines.

4. The method of claim 1, wherein the step of providing the plugging compound comprises providing the plugging compound as a second base batch compound comprising inorganic constituents, and a second batch cross-link agent.

5. The method of claim 4, wherein the step of providing the plugging compound further comprises selecting the second base batch compound from a group consisting of oxides, oxide compounds, metal compounds and mixtures thereof that react at high temperatures to produce a ceramic phase.

6. The method of claim 5, further comprising:
providing a second ceramic surfactant; and
mixing the second ceramic surfactant with the second base batch compound and the second batch cross-link agent prior to plugging the honeycomb structure.

7. The method of claim 1, wherein the forming step comprises extruding the first base batch compound, the first batch cross-link agent and the aqueous vehicle into the honeycomb structure.

8. The method of claim 1, wherein the step of providing the first base batch compound comprises selecting the first base batch compound from a group consisting of oxides, oxide compounds, metal compounds and mixtures thereof that react at high temperatures to produce a ceramic phase.

9. A method for manufacturing a honeycomb structure, comprising the steps of:
providing a mixed ceramic solution comprising a first base batch compound comprising inorganic constituents, a first batch cross-link agent capable of cross-linking with the mixed ceramic solution, a first ceramic surfactant, and an aqueous vehicle, wherein the first ceramic surfactant is selected from the group consisting of tall oil and tall oil with an amine additive and wherein the inorganic constituents of the first base batch compound include at least a select one of a group consisting of oxides, oxide compounds, metal compounds and mixtures thereof that react at high temperatures to produce a ceramic phase, in the mixed ceramic solution, the first batch cross-link agent reacting with a hydroxyl group via at least a select one of a condensation mechanism and a ring open mechanism;
extruding the mixed ceramic solution into a green honeycomb structure having a plurality of open end channels;
providing a plugging material that comprises a second base batch compound comprising inorganic constituents;
plugging at least a select number of the open end channels of the green honeycomb structure with a plugging material to form a plugged, green honeycomb structure; and
drying the plugged, green honeycomb structure in a single drying step.

10. The method of claim 9, wherein the step of providing the mixed ceramic solution includes selecting the first batch cross-link agent from a group consisting of formaldehyde, diahehyde, acrylic anhydride, diisocyanate, epihalohydrin, polyamides, polyacrolein and polyimines.

11. The method of claim 9, further comprising:
mixing a second ceramic cross-linking agent with the plugging material prior to plugging the green honeycomb structure.

12. The method of claim 11, further including:
mixing a second ceramic surfactant with the plugging material prior to plugging the honeycomb structure.

* * * * *